Figure 7:
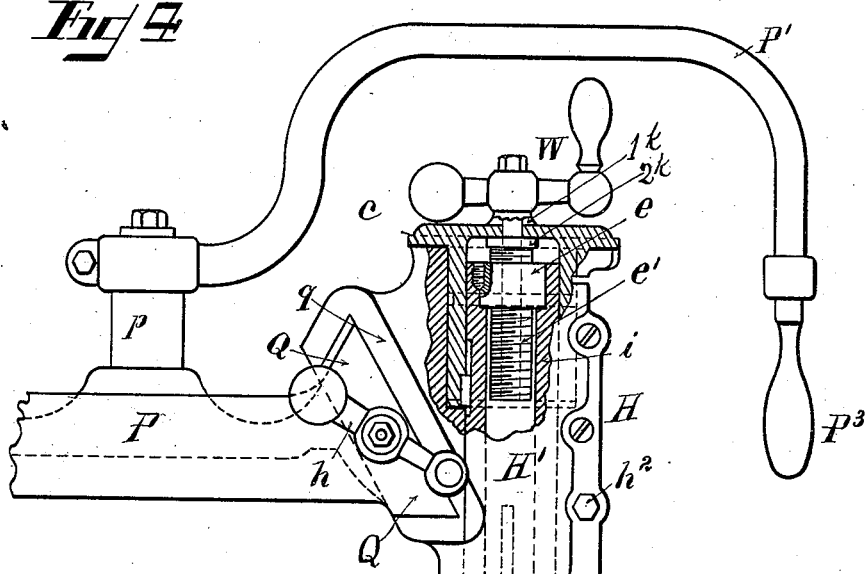

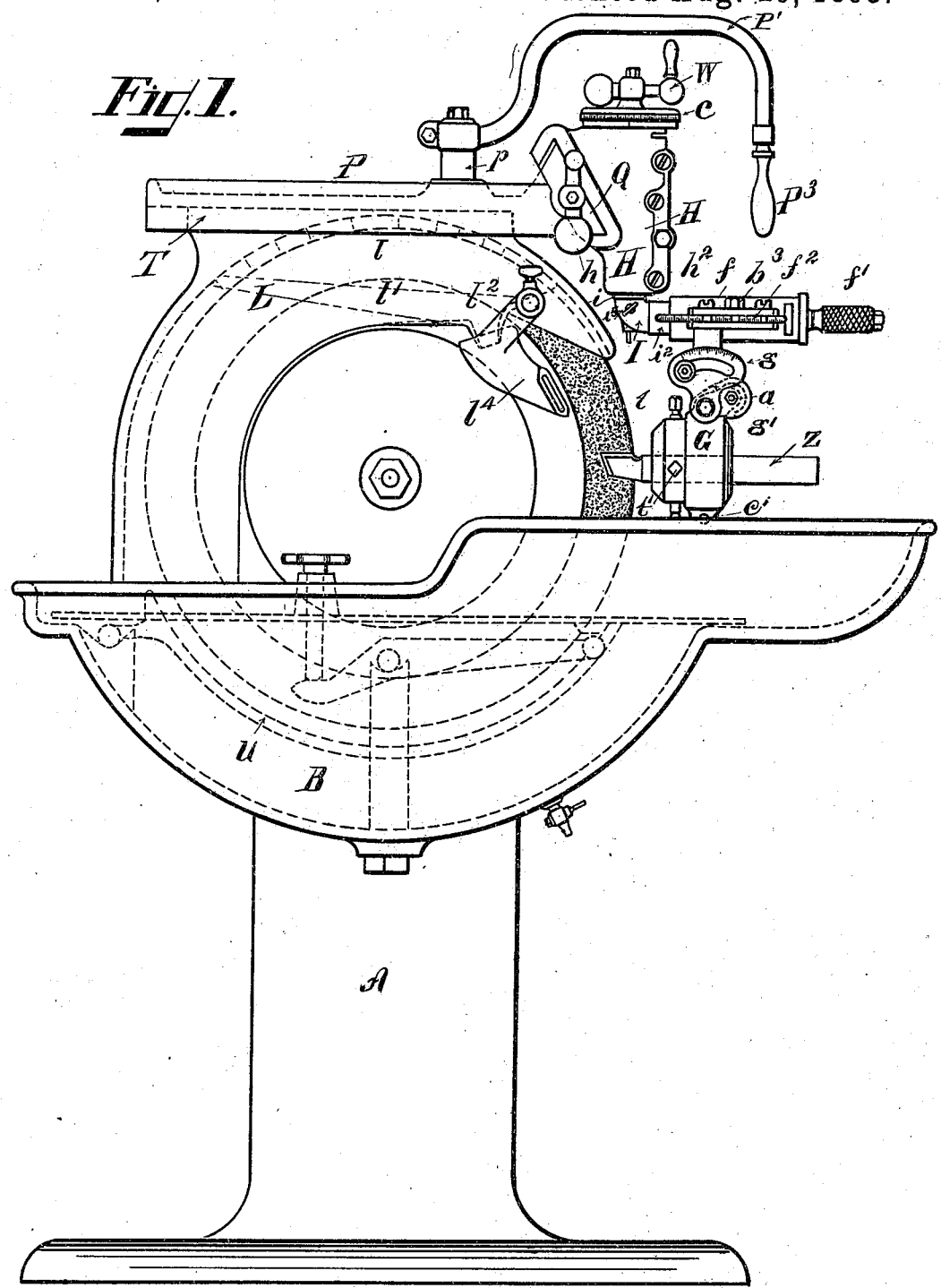

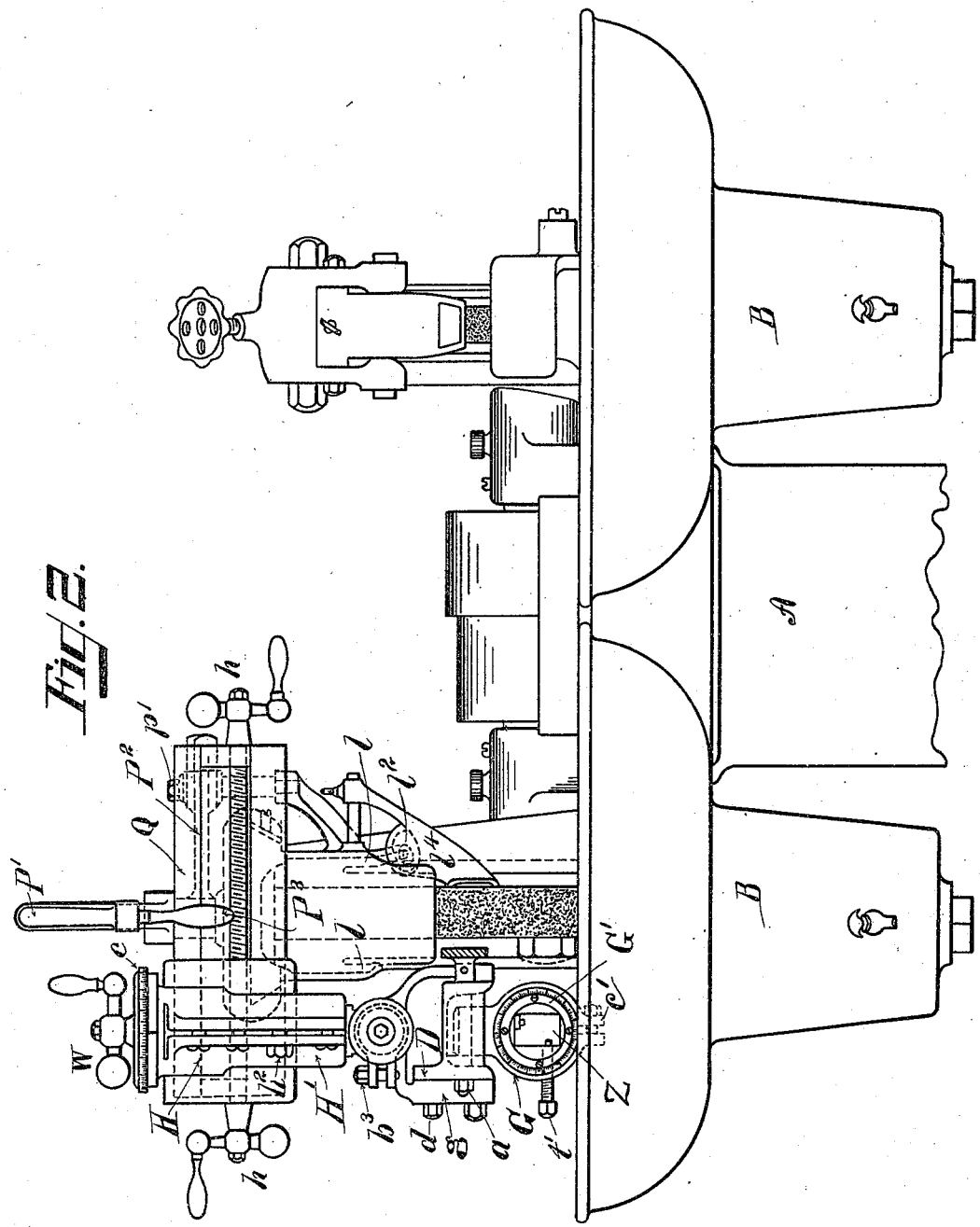

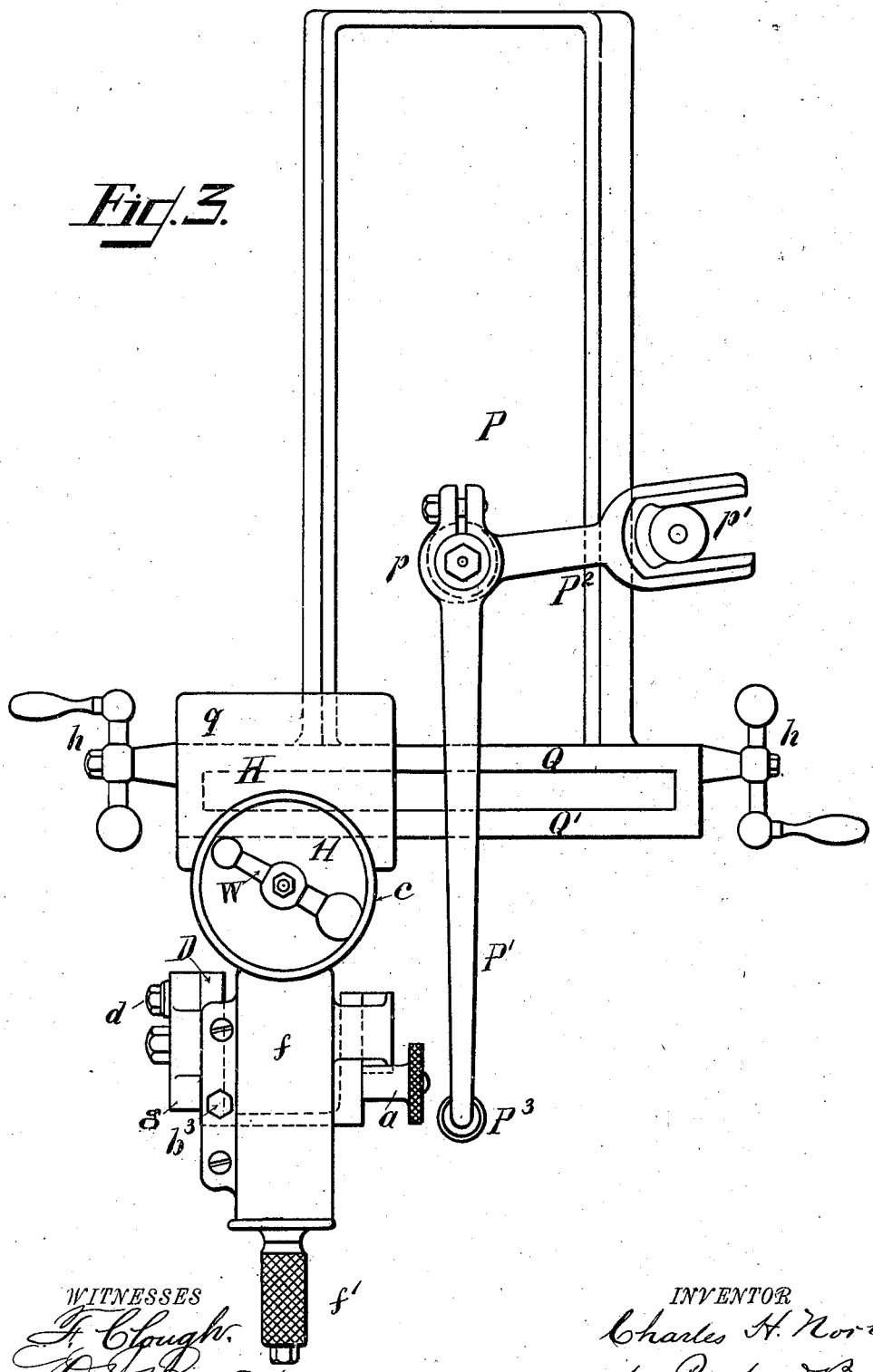

(No Model.) 7 Sheets—Sheet 4.

C. H. NORTON.
UNIVERSAL GRINDER.

No. 504,306. Patented Aug. 29, 1893.

WITNESSES
F. Clough
D. W. Bradford

INVENTOR
Charles H. Norton
by Parker & Burton
Attorneys.

(No Model.) 7 Sheets—Sheet 5.

C. H. NORTON.
UNIVERSAL GRINDER.

No. 504,306. Patented Aug. 29, 1893.

WITNESSES
F. Clough.
D. H. Bradford

INVENTOR
Charles H. Norton
by Parker & Burton
Attorneys.

(No Model.) 7 Sheets—Sheet 6.

C. H. NORTON.
UNIVERSAL GRINDER.

No. 504,306. Patented Aug. 29, 1893.

WITNESSES
F. Clough.
O. W. Bradford

INVENTOR
Charles H. Norton
by Parker & Burton
Attorneys.

(No Model.) 7 Sheets—Sheet 7.

C. H. NORTON.
UNIVERSAL GRINDER.

No. 504,306. Patented Aug. 29, 1893.

WITNESSES
J. W. Bradford
F. Clough

INVENTOR
Charles H. Norton
by Parker & Burton
Attorneys.

UNITED STATES PATENT OFFICE.

CHARLES H. NORTON, OF DETROIT, MICHIGAN, ASSIGNOR TO THE LELAND FAULCONER & NORTON COMPANY, OF SAME PLACE.

UNIVERSAL GRINDER.

SPECIFICATION forming part of Letters Patent No. 504,306, dated August 29, 1893.

Application filed February 23, 1892. Serial No. 422,384. (No model.)

*To all whom it may concern:*

Be it known that I, CHARLES H. NORTON, a citizen of the United States, residing at Detroit, county of Wayne, State of Michigan, have invented certain new and useful Improvements in Universal Grinders; and I declare the following to be a full, clear, and exact description of the invention, such as will enable others skilled in the art to which it pertains to make and use the same, reference being had to the accompanying drawings, which form a part of this specification.

This invention relates to grinding machines and has for its object an improvement in the tool holder to be used in connection with the grinding wheel, and an improvement in the hood or cover to be used in connection with a grinding wheel in "wet grinding."

The improvement in the hood or cover enables me to gather from the face of the wheel, nearly all the water that has been carried up by it, and to deliver the water so gathered against the side of the wheel, just above the tool that is under treatment and the improvement in the tool holder enables me to hold the tool, to be treated, in any desired position with respect to either side of the wheel. To attain the desired result I arrange the tool holder so that it may be adjusted in a number of distinct ways, and I give to it several movements, all of which are governed automatically by the mechanism employed, but which result in producing on the finished tool a face ground true according to the desire of the operator, as indicated by the adjustments he has employed in operating the machine. Thus with a tool holder made according to this invention, the operator may grind either or both sides of the tool, or the end of it, and may grind the end square or round, or beveled or with a meeting angle, or he can if he desires, grind behind the front face of the tool and finish it with an enlarged front face connected to the tang of the tool by a neck, and he can give to the face of the tool any angle of clearance, that he may have determined upon, thus constituting the holder in reality, a universal holder for the purpose specified. During any of this work, the grinding face of the wheel is kept constantly wet by a stream of water taken up from a trough below the wheel and through which the wheel runs, and delivered at the side of the wheel just above the tool under treatment. These results are attained by the machine shown in the accompanying drawings, in which—

Figure 8:
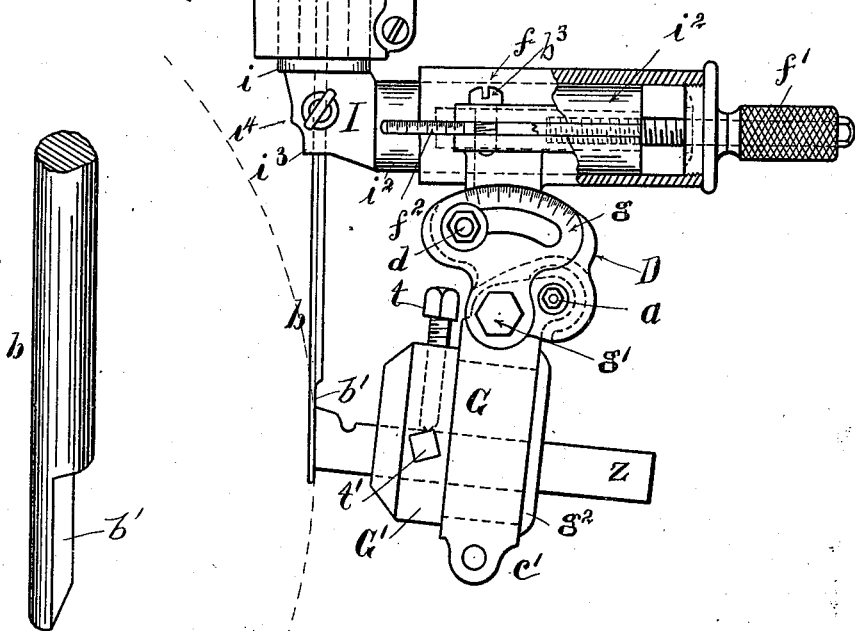
Figure 5:
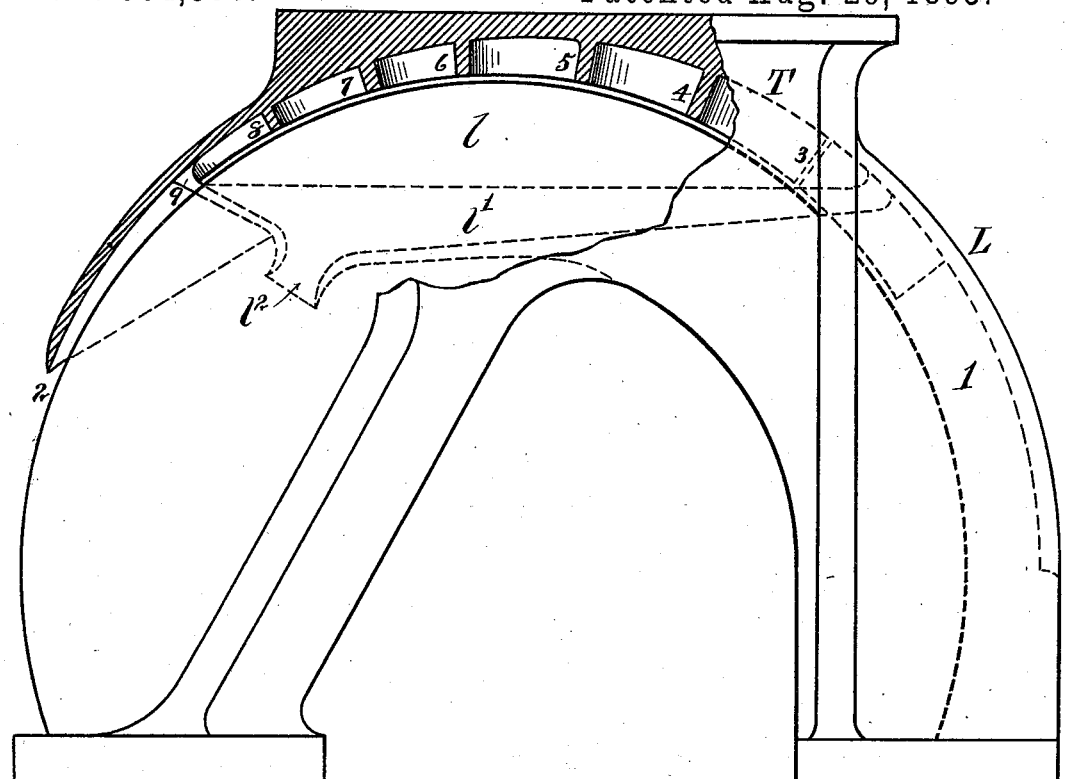
Figure 6:
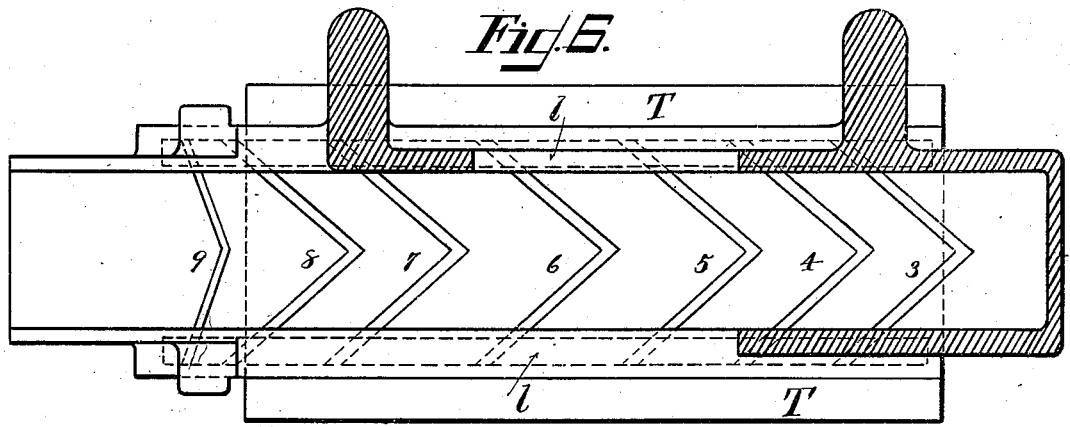
Figure 7:
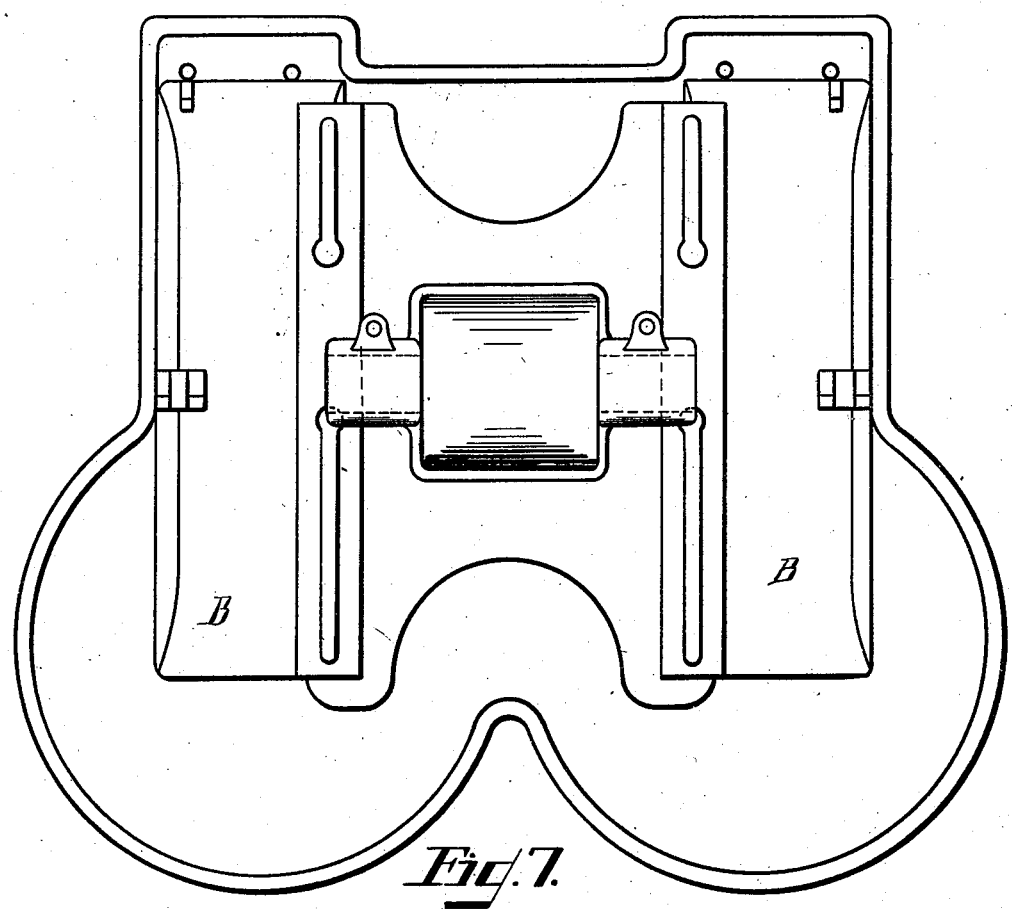
Figure 9:
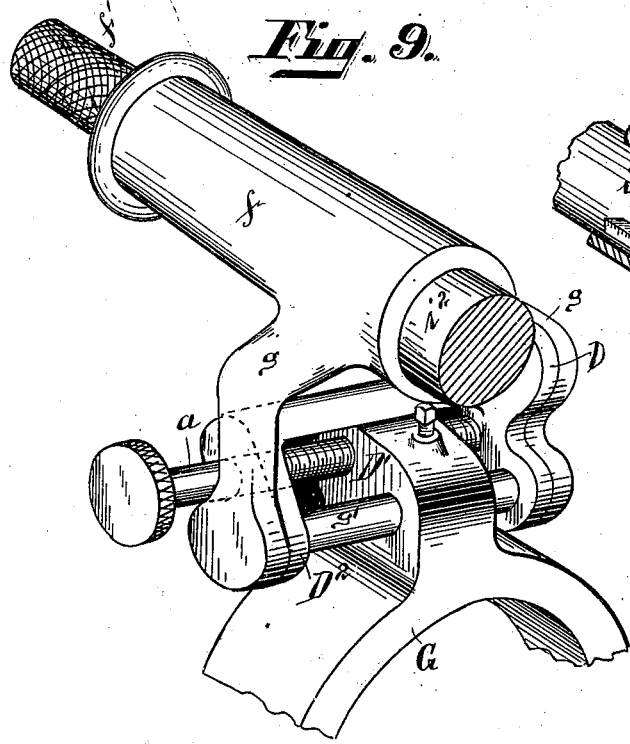
Figure 10:
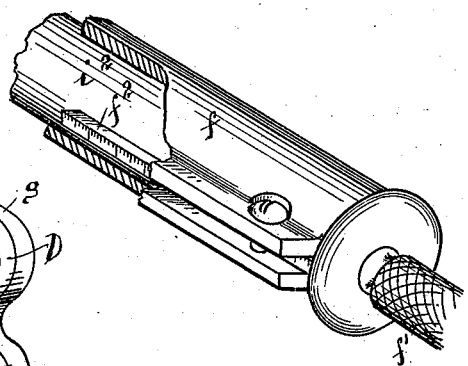
Figure 11:
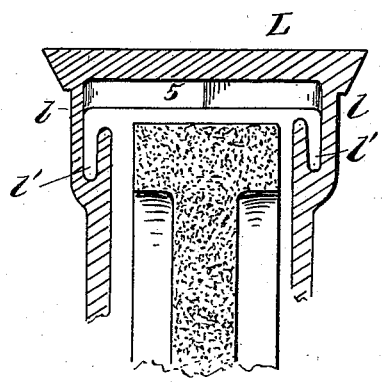

Figure 1 is a side elevation. Fig. 2 is a front elevation. Fig. 3 is a plan of the tool holder removed from the frame of the grinding wheel. Fig. 4 is a side elevation of the holder removed from the wheel, the position of which is however indicated by dotted lines. Fig. 5 is an elevation of the grinding wheel and hood. Fig. 6 is an inverted plan of the hood showing diaphragm to cross it. Fig. 7 is a plan view of the double grinding wheel with the tool holder removed therefrom. Fig. 8, is an enlarged view in perspective of the setting rod shown in Fig. 4. Fig. 9, shows in detail the means for shifting the hanging ring G, across its supporting hanger. Fig. 10 shows a detail of the graduated feather and sleeve on the horizontal arm $i^2$. Fig. 11 shows in cross section the hood, side flaps and conduits.

In Fig. 4 some of the parts are broken away to permit the interior mechanism to be indicated.

This invention is used in connection with grinding wheels running in water troughs or pans of the form shown and described in the patent granted to me August 18, 1891, No. 458,036, in which was fully described the supporting standard A, the water pans B, the inner pivoted water trough U. I also use a water guard L, similar to the water guard of my previous patent, but differing somewhat in particulars which will be described. The depending sides or flaps $l$ of the hood L are curved inward toward the stone and upward to form troughs as in my previous patent. The hood L is however not concentric with the shaft of the grinding stone, but has a wider opening between its inner surface and the stone at the rear than at the forward part where it terminates. The opening 1 behind the stone gradually narrows down until at the point 2, where the hood terminates in front of the stone it is quite narrow.

Across the opening above the stone between the depending flaps $l$, are angled diaphragms, 3, 4, 5, 6, 7, 8, 9, having the apex of the angle of each diaphragm at about the middle line of the stone and pointed toward the back of the stone, so that the water adhering to the stone as it passes through the trough, is carried upward and forward by the revolution of the stone, strikes against the diaphragms and is deflected to the side walls or flaps of the hood, whence it drops downward into the trough $l'$ and is carried to the discharge spout $l^3$, and delivered into a hinged nozzle $l^4$, shown best in Fig. 2. There is such a trough, spout and nozzle on each side of the wheel, but inasmuch as they are duplicates only one is shown in the drawings. The hinged nozzle $l^4$ may be set to deliver the water passing through it, high up or low down on the stone as may be desired.

On the upper part of the hood L either made integral with it or attached to it, is a tubular support T, upon which is fitted a sliding plate P; the two parts being fitted together in any of the well known ways by which a sliding plate or frame may be attached to a fixed rest over or along which it slides, and to which it is held from side movement. Across the end of the sliding plate P is a track or way Q, upon which travels the holder H, held to the way Q, by any of the well known manners in which one part is held movable to a way; the manner shown in the drawings Figs. 4 and 3, is an under cut or dovetailed runner $q$, fitted over the outside of the dovetailed track Q, Q'. The runner $q$, is moved in either direction along the way by means of a screw provided with a hand wheel $h$, at each end of the track Q. From the plate P rises a post $p$, upon which is fulcrumed a bell crank lever P', P², one end of which extends forward and terminates with a handle P³. The other end of the bell crank lever extends sidewise beyond the edge of the plate P, and terminates in a fork, and between the branches of the fork a post $p'$, rises from the frame work of the grinder. As the handle P³, is moved in either direction, the plate P is moved correspondingly. The stationary post $p'$ acts as a fulcrum and the movable post $p$, with the plate from which it rises moves forward as the handle P³ is moved to the right, and backward when the handle P³ is moved to the left. The lever P', is bent into a goose neck of which the turn rises over the holder H, while the handle P³ terminating it drops down into position to be readily reached by the operator. By the use of the two sliding pieces already described the operator can produce a motion to or from him, or a motion at right angles to this motion, and across from one side of the grinding wheel to the other.

The holder H consists of a vertical sleeve H', fixed to the runner $q$. Within the sleeve H', is the upright part of a rectangular arm I; the upright part or branch $i$, of the arm I, is adapted to move vertically in the sleeve H', and its vertical movement is forced by the screw $e'$ working through a nut $e$. The nut $e$, is either made integral with or is fast to the branch $i$, of the arm I, and the screw $e'$ is provided with a collar or double collar $k'$, $k^2$, by which it is held to the cap $c$, of the vertical sleeve H'. The branch $i$, below the nut $e$ is hollow and within the hollow, the lower end of the screw $e'$ is received. A second branch $i^2$ of the arm I, extends horizontally at right angles to the vertical branch $i$. Through the elbow of the arm I is a vertical perforation $i^3$, centrally in line with the center line of the branch $i$; and within the perforations $i^3$ is placed and held by means of a set screw $i^4$, a setting bar $b$. The lower end $b'$ of the setting bar $b$, is cut away so that its forward side is flat and exactly in line with the center line or axis of rotation of the branch $i$. The branch $i$, is keyed to the cap $c$, and the two parts rotate together. On the branch $i^2$, slides a sleeve $f$, which is moved backward on the branch $i^2$, in a manner precisely similar to the movement of the branch I, in the sleeve H', except that in the latter case, the sleeve $f$, is movable, and the branch $i^2$ stationary.

In place of the hand wheel $w$, used with the vertical branch is a handle $f'$, which is used both to turn the screw and to rotate the branch $i^2$ with the sleeve upon it around the vertical axis of the branch $i$. The sleeve $f$, is split at one side, and between the edges of the split is a graduated feather $f^2$. The feather $f^2$ is fixed or attached firmly to the branch $i^2$, and the sleeve $f$, is clamped to the feather by means of the set screw $b^3$. The sleeve H', is clamped to the branch $i$, by means of the clamping screw $h^2$.

From the sleeve $f$, depends a hanger $g$, by which is supported a ring G, swung on the bolt $g'$. Within the ring G is a second ring G', which forms the final tool holder. The ring G' turns on its axis within the ring G, and is held in the desired position by the clamp $c'$. The tool is held in the ring G' by means of two holding screws $t$, $t'$. The ring G, has an upward extending projection D', through which passes the pin bolt $g'$, and an adjusting screw, $a$. The pin bolt $g'$, traverses an interior frame work D, D², and also traverses the downward extending arms of the hanger $g$. To the end D, of the frame D, D², is made fast a screw threaded bolt $d$, which traverses a curved slot in the hanger $g$, (shown best in Fig. 4,) and by means of this screw threaded bolt and a nut fitting upon it, the ring G, is clamped with its axis at an angle to the axis of the sleeve $f$. The frame D, D², moves with the ring G, in rotation around the pin $g'$, and the ring G, is capable of movement along the pin $g'$, between the sides D, D², of the frame, and is adjusted along the pin $g'$, by means of the screw, $a$. The screw, $a$, is journaled in the parts D, D², and its threaded part passes through the internally threaded projection D, rising from the ring G. This last adjustment permits the tool Z to be inclined so as to grind it the requisite angle for clearance.

The movements which have been described, and which the tool can be caused to have, are thus seen to be, first, the movement forward and back of the entire tool holder on the table T; second, a movement across the face of the stone or from one side of it to the other across the sliding plate P; third, a movement around the axis of the vertical arm $i$. These movements are employed after the tool has been placed in the holder and adjusted in position by the proper movement of the adjusting parts, which are as follows: first, a movement toward or away from the setting bar $b$, by sliding the sleeve, $f$, on the arm $i^2$; second, a movement of the tool holding ring G, across the hanger $g$, to bring the nose of the tool to the vertical axis of the upright arm $i$; third, a movement of the ring G around the belt $g'$, to provide for grinding to a proper angle of clearance; fourth, a movement of the holding ring G' axially within the ring G, to adjust the vertical or horizontal axis of the tool to any desired angle. The cap $c$, is graduated so that the workman can rotate the vertical arm an equal distance to the right or to the left and can know when he has rotated it in one direction a distance equal to that which he has previously rotated it in the other direction. The cap $g^2$, is also graduated so that the workman can set the tool with its vertical axis at a given angle to a true vertical line and subsequently if he wishes can set it at an equal angle in an opposite direction.

The operation of grinding a tool as for instance a round nosed tool is as follows: Place the setting bar $b$, as shown in Fig. 4; next turn the holding ring G, upon the axis $g'$ to the angle desired for clearance upon the tool to be ground; place the tool in the ring G', with the point touching the setting bar $b$, and clamp it there by the set screws $t$, $t'$; next move the tool and the rings by which it is held sidewise by means of the cross screw $a$, to a point approximately central with the axis of the setting bar $b$. The setting bar $b$, is then lifted upward out of the way and held fast by the thumb screw $i^4$. The sleeve $f$, is then moved forward by means of the handle $f'$ noting the graduations on the scale $f^2$, until the desired radius of the tool is measured; the branch $i^2$, is then swung by means of the handle $f'$, to a point at right angles to the side or working face of the wheel. The tool is then moved against the wheel by means of the hand wheel $h$, and cross slide Q. The branch $i^2$, is swung on its axis by means of the handle $f'$ keeping the tool pressed against the working face of the wheel by turning the hand wheel $h$, until the required surface is produced. By using the corner or angle of the grinding wheel where the cylindrical surface meets the flat surface, the body of the tool is cut away from behind the nose producing one side of the required neck. Two-thirds of the circle may thus be ground on one side of the wheel, and to complete the work the part H, and all the parts supported by it are moved to the other side of the wheel. The tool is set to be ground on that side and the operation repeated.

I have chosen the peculiar shaped tool mentioned as a complex form of tool to the grinding of which this machine is adapted.

Many other forms may be ground, and it is readily seen that the tool can always be ground symmetrical on both sides if it is desired.

I claim—

1. In a tool grinder the combination of a supporting arm adjustable in a horizontal arc on a vertical axis, a tool holding clamp adjustable horizontally across the axis of said supporting arm and in a vertical arc on a horizontal axis, means for securing the clamp and arm in their adjusted position.

2. In a tool grinder, the combination of a holding frame a compound slide adapted to move forward and across said frame, a vertically movable arm supported by said slide, carrying a horizontal branch, a hanger depending from said horizontal branch, a holding ring hinged to said hanger a clamping ring concentric with said holding ring, and having an axial adjustment therein, means for securing and holding a tool in said clamping ring, substantially as and for the purpose described.

3. In a tool grinder the combination of, a holding frame, a compound slide adapted to move forward and across said frame, a vertically movable arm supported by said slide and provided with a horizontal branch, a sleeve adjustable along said horizontal branch, a hanger depending therefrom, a tool holding clamp supported by said hanger, means for adjusting the movable parts, substantially as and for the purpose described.

4. In a tool grinder, the combination of a holding frame a compound slide adapted to move forward and across said frame work an arm supported by said slide, adapted to have vertical movement and a tool holding clamp carried by said arm and provided with adjustments whereby said tool contained in said clamp may be rotated and moved angularly, substantially as and for the purpose specified.

5. In a tool holder, the combination of a sleeve supported on a sliding frame work, adapted to give to said sleeve, horizontal motion in either direction, an arm, journaled in said sleeve, and provided with a branch at right angles to the part forming said journal, a sleeve adapted to slide on said branch, and a tool holding clamp supported by said sleeve, substantially as and for the purpose specified.

6. In a tool grinder, the combination of a holding frame, a compound slide adapted to move forward and across said frame, a vertically adjustable rotatable arm supported by said slide, a tool holder supported by said arm, means for horizontal adjustment with respect to said rotatable arm, substantially as and for the purpose described.

7. In a tool grinder the combination of, a vertically adjustable hollow support rotatable on its vertical axis, an arm extending horizontally from said support, a tool holder mounted on and adjustable along said horizontal arm, a guide adapted to be held in said hollow support and to indicate its center of rotation, substantially as and for the purpose described.

8. In a grinding machine, the combination of a hanging tool holder, a supporting arm therefor, a sleeve adapted to slide on said arm, a feather secured to said arm and engaging a slot in said sleeve, means for adjusting said sleeve longitudinally along the arm, and means for clamping the sleeve to the arm, substantially as and for the purpose specified.

9. In a tool grinder, the combination of a primary support having a horizontal adjustment, a vertical sleeve supported on said primary support, a sleeve mounted and having vertical adjustment therein, an arm extending at right angles to said second mentioned sleeve, a tool holder mounted on said arm adapted to rotate with said arm about the vertical axis of said second sleeve, a guide adapted to be received in said sleeve, and to indicate below the same its vertical axis of rotation.

10. In a tool grinder the combination of, a main frame work a vertically hanging, vertically adjustable hollow support bent at right-angles and having one vertical and one horizontal branch, a slotted sleeve mounted on and horizontally adjustable along said horizontal branch, a feather secured to said horizontal branch and extending through the slot in said sleeve, a tool holding clamp hanging from said sleeve, means for adjusting the sleeve along the branch, and means for clamping the sleeve to the feather, substantially as and for the purpose described.

11. In a grinder, a primary support having a horizontal adjustment, a vertical sleeve support on said primary support, and a sleeve mounted and having a vertical adjustment therein, a mandrel extending at right angles to said sleeve, a tool holder mounted on said mandrel and adapted to rotate with said mandrel about the center of rotation of said sleeve, and a guide mounted in said sleeve and adapted to indicate below the same its center of rotation, substantially as described.

12. In a tool grinder, the combination of a water trough, a stone partially immersed in water contained in said trough, a hood provided with side flaps and conduits adapted to catch the water lifted by said stone and direct it forward, substantially as and for the purpose described.

13. In a tool grinding machine, the combination of a water trough, a stone adapted to revolve partially immersed in water contained in said trough, a hood provided with side flaps and conduits, and with diaphragms across said hood above the stone, said diaphragms being adapted to stop the water raised by the grinding wheel and direct it into the conduits, substantially as and for the purpose specified.

14. In a tool grinder, the combination of a water trough, a stone partially immersed in the water contained therein, a hood having side flaps and conduits pointed diaphragms across said hood above the stone having their apexes at the middle line of said stone, and their points directed toward the body of water raised by said stone, whereby the water is caught and directed to both the side conduits, substantially as and for the purpose described.

15. In a tool grinder, the combination of a water trough a stone adapted to rotate partly immersed in the water within said trough a curved hood, having its curvature eccentric to said stone provided with side flaps and conduits, leading from the rear to the front of said stone, diaphragms across the said hood, having a greater radial depth at the rear than at the front of said stone, substantially as and for the purpose specified.

16. In a grinding machine, the combination of a water trough, a grinding wheel, a hood having side flaps provided with conduits a movable nozzle, adapted to receive water from said conduits and direct it against the face of the grinding wheel, substantially as and for the purpose specified.

In testimony whereof I sign this specification in the presence of two witnesses.

CHARLES H. NORTON.

Witnesses:
CHARLES F. BURTON,
EFFIE I. CROFT.